United States Patent
Ouyang et al.

(10) Patent No.: US 9,784,915 B2
(45) Date of Patent: Oct. 10, 2017

(54) CROSS-SHAPED INFRARED POLARIZED LIGHT BRIDGE BASED ON PHOTONIC CRYSTAL WAVEGUIDE

(71) Applicant: Zhengbiao Ouyang, Shenzhen (CN)

(72) Inventors: Zhengbiao Ouyang, Shenzhen (CN); Xin Jin, Shenzhen (CN); Quanqiang Yu, Shenzhen (CN)

( * ) Notice: Subject to any disclaimer, the term of this patent is extended or adjusted under 35 U.S.C. 154(b) by 0 days.

(21) Appl. No.: 15/253,703

(22) Filed: Aug. 31, 2016

(65) Prior Publication Data

US 2016/0370541 A1  Dec. 22, 2016

Related U.S. Application Data

(63) Continuation of application No. PCT/CN2015/074384, filed on Mar. 17, 2015.

(30) Foreign Application Priority Data

Mar. 21, 2014 (CN) .......................... 2014 1 0108216

(51) Int. Cl.
*G02B 6/12* (2006.01)
*G02B 6/122* (2006.01)
(Continued)

(52) U.S. Cl.
CPC ........... *G02B 6/1225* (2013.01); *G02B 6/125* (2013.01); *G02B 6/126* (2013.01)

(58) Field of Classification Search
CPC ....... G02B 6/125; G02B 6/126; G02B 6/1225
See application file for complete search history.

(56) References Cited

U.S. PATENT DOCUMENTS

| | | | |
|---|---|---|---|
| 2002/0041749 A1* | 4/2002 | Johnson | B82Y 20/00 385/129 |
| 2013/0028553 A1* | 1/2013 | Jia | B82Y 20/00 385/11 |

(Continued)

*Primary Examiner* — Jerry Rahll
(74) *Attorney, Agent, or Firm* — Wayne & King LLC

(57) ABSTRACT

A cross-shaped infrared polarized light bridge based on a photonic crystal waveguide. The present invention aims to provide a polarized light bridge that is small in structural size, high in polarization degree, convenient to integrate, and highly efficient, besides which, crosstalk is not caused at a cross intersection. The cross-shaped infrared polarized light bridge comprises a photonic crystal waveguide provided with a complete bandgap. The photonic crystal waveguide is in a cross shape. Waveguide defect dielectric columns are disposed in the photonic crystal cross-shaped waveguide. The waveguide defect dielectric columns are square defect dielectric columns (6) and round defect dielectric columns (7). The photonic crystal cross-shaped waveguide comprises a vertical TE waveguide, a horizontal TM waveguide, a TM optical signal input port (1), a TM output port (3), a TE optical signal input port (2), and a TE output port (4). The two input ports (1,2) of the photonic crystal waveguide separately input a TM optical signal and a TE optical signal. Mutual influence is not caused at a cross intersection position of light circuits formed by the TM wave and the TE wave in a shared central area. The input TM optical signal is output from the TM output port (3). The input TE optical signal is output from the TE output port (4).

7 Claims, 11 Drawing Sheets

(51) Int. Cl.
G02B 6/125 (2006.01)
G02B 6/126 (2006.01)

(56) References Cited

U.S. PATENT DOCUMENTS

2013/0294722 A1* 11/2013 Vuckovic ............... G02F 1/3534
385/14
2014/0355927 A1* 12/2014 Ouyang ................ G02B 1/005
385/11

* cited by examiner

US 9,784,915 B2

CROSS-SHAPED INFRARED POLARIZED LIGHT BRIDGE BASED ON PHOTONIC CRYSTAL WAVEGUIDE

CROSS-REFERENCE TO RELATED APPLICATIONS

This application is a continuation of International Patent Application No. PCT/CN2015/074384 with a filing date of Mar. 17, 2015, designating the United States, now pending, and further claims priority to Chinese Patent Application No. 201410108216.X with a filing date of Mar. 21, 2014. The content of the aforementioned applications, including any intervening amendments thereto, are incorporated herein by reference.

TECHNICAL FIELD

The present invention relates to the field of micro-optical polarized light bridges, and particularly relates to a micro-optical polarized light bridge based on a photonic crystal technology.

BACKGROUND OF THE PRESENT INVENTION

The traditional light bridges and polarized light bridges are relatively large in volume and cannot be used in light path integration because of applying a geometric optical principle. Micro devices including polarized light bridges can be produced on the basis of photonic crystals. Erection of a photonic crystal guided-wave light circuit of a polarized light bridge is generally realized by introducing line defects in a photonic crystal with a complete bandgap. In the technical perspective of polarized light control and splitting, the polarized light control and splitting are generally realized through two methods: one method is that polarization splitting for waves is realized by virtue of a photonic crystal with a TE bandgap and a TM conduction band or with a TM bandgap and a TE conduction band; and the other method is that waveguides are coupled in a long range, and light waves with different polarization states are coupled to the different waveguides by virtue of the methods of periodic coupling among the waveguides, and odd-state and even-state changes. The two methods can only be used for designing conventional polarizing devices, but cannot be used for designing a polarized light bridge by applying the characteristics of the two methods, wherein the polarized light bridge is a device capable of allowing optical signals with different polarization states to be subjected to intersection conduction without mutual influence at the position of a waveguide junction. Further, the abovementioned photonic crystal waveguide has only a single function and is still seemed relatively large although the volume is much smaller than that of a traditional polarizing device.

SUMMARY OF PRESENT INVENTION

The objective of the present invention is to overcome shortages in the prior art, and provide a cross-shaped infrared polarized light bridge based on a photonic crystal, which is small in structural volume, high in degree of polarization, convenient for integration and highly efficient.

In order to solve the abovementioned technical problems; the following technical solution is adopted in the present invention;

The cross-shaped infrared polarized light bridge based on a photonic crystal waveguide of the present invention comprises a photonic crystal waveguide provided with a complete bandgap, wherein the photonic crystal waveguide is in a cross shape, waveguide defect dielectric cylinders are arranged in the photonic crystal cross-shaped waveguide, and the waveguide defect dielectric cylinders are square defect dielectric cylinders and round defect dielectric cylinders; the photonic crystal cross-shaped waveguide is composed of a vertical TE waveguide, a horizontal TM waveguide, a TM optical signal input port, a TM output port, a TE optical signal input port and a TE output port; and the two input ports of the photonic crystal waveguide input a TM optical signal and a TE optical signal respectively, mutual influence is not caused at the cross intersection position of light circuits formed by the TM wave and the TE wave in a shared central area, the input TM optical signal outputs from the TM output port, and the input TE optical signal outputs from the TE output port.

The defect dielectric cylinders in the vertical TE waveguide are four square dielectric cylinders, and the defect dielectric cylinders in the horizontal TM waveguide are three round dielectric cylinders; and the central positions of the four square dielectric cylinders within the vertical TE waveguide and the three round dielectric cylinders within the horizontal TM waveguide are the same as the central positions of the corresponding background dielectric cylinders thereof deleted for forming the waveguides.

A left port, a right port, an upper port and a lower port of the photonic crystal waveguide are the TM optical signal input port, the TM output port, the TE optical signal input port and the TE output port, respectively.

The photonic crystal waveguide is a 2D photonic crystal waveguide, including a 2D tellurium dielectric photonic crystal waveguide, a 2D cellular-structure photonic crystal waveguide, a 2D hole-like triangular lattice photonic crystal waveguide and various 2D photonic crystal waveguides with irregular shapes.

The photonic crystal waveguide is a structure formed after removing one row or two rows or three rows or four rows of dielectric cylinders from the photonic crystal.

The plane of the photonic crystal waveguide is vertical to the axes of the dielectric cylinders in the photonic crystal.

The refractive index of an e light in each of the waveguide defect dielectric cylinders is greater than the refractive index of an o light, and the optical axes of the square waveguide defect dielectric cylinders are parallel to the plane of the photonic crystal waveguide and orthogonal to propagation directions of waves.

The number of the waveguide defect dielectric cylinders is 1 or 2 or 3 or 4 or 5 or 6.

The optical axes of the round defect dielectric cylinders within the TM waveguide are consistent with the optical axes of the background dielectric cylinders in direction.

A waveguide formed by background tellurium dielectric cylinder arrays, and the waveguide is a guided wave waveguide formed by deleting two lines or two columns of dielectric cylinders.

The present invention has the following advantages compared with the prior art:

1. The cross-shaped infrared polarized light bridge based on the photonic crystal waveguide is small in structural volume, high in light transmission efficiency, and suitable for large-scale light path integration.

2. The TE light wave signal and the TM light wave signal can be efficiently subjected to directional conduction in a short range, and crosstalk is not caused at the intersection position of the cross-shaped light bridge.

3. The function of directional conduction for the polarized light waves can be realized through four point defects in a short range, thus integration is facilitated and high efficiency is achieved.

4. Compared with other polarization splitting devices adopting a coupled-cavity mode, the device has a quite high extinction ratio, a high degree of polarization, an extremely low insertion loss and a wide operating wavelength range, and can allow pulses with certain spectral widths or Gaussian lights or lights with different wavelengths to work, or allow lights with a plurality of wavelengths to work simultaneously.

5. Five different application functions can be realized on the existing light bridge architecture according to the characteristic of the polarization selection of the device.

6. According to principle of the present invention, a function of polarization splitting for different wavelengths can be realized through a method of changing a lattice constant in an equal proportion by applying the characteristic of scaling in an equal proportion of the photonic crystal in case of no consideration for chromatic dispersion or negligible chromatic dispersion.

DESCRIPTION OF THE DRAWINGS

In FIG. 1, 1: TM optical signal input port (left port 1); 2: TE optical signal input port (left port 2); 3: TM optical signal output port (right port 3); 4: TE optical signal output port (upper port 4); 5: background tellurium dielectric cylinder; 6: square defect dielectric cylinder; and 7: round defect dielectric cylinder.

In FIG. 2, a lattice constant $L1=a$; a circle center distance of the dielectric cylinders between the waveguides, $L2=3a$; a side length of each square point defect, $L3=0.538a$; a distance between each round point defect and the corresponding background dielectric cylinders 5, $L4=1.5a$; a distance among the square point defects and the distance between neighbouring square point defect and background dielectric cylinders 5, $L5=a$; a distance among the round point defects, $L6=a$; a radius of each background tellurium dielectric cylinder 5, $R1=0.3431a$; and a radius of each round point defect, $R2=0.165a$.

FIG. 7A is the distribution diagram of TE components. FIG. 7B is the distribution diagram of TM components.

DETAILED DESCRIPTION OF PREFERRED EMBODIMENTS

Figure 1:
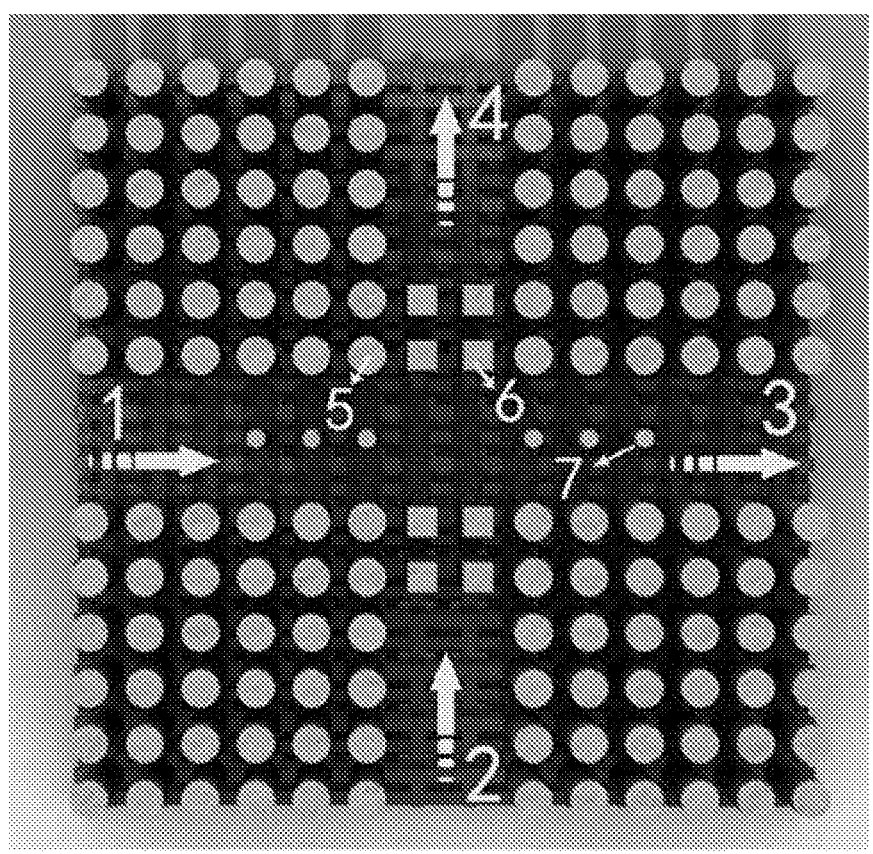
FIG. 1 is a structural schematic diagram of a Tellurium photonic crystal and a waveguide used in the present invention.

The present invention will be further elaborated below in detail with reference to the accompanying drawings and embodiments:

As shown in FIG. 1, the cross-shaped infrared polarized light bridge based on the photonic crystal waveguide of the present invention comprises a photonic crystal waveguide provided with a complete bandgap, wherein the photonic crystal waveguide is in a cross shape, waveguide defect dielectric cylinders are arranged in the photonic crystal cross-shaped waveguide, and the waveguide defect dielectric cylinders are square defect dielectric cylinders and round defect dielectric cylinders; and the photonic crystal cross-shaped waveguide is composed of a vertical TE waveguide, a horizontal TM waveguide, a TM optical signal input port, a TM output port, a TE optical signal input port and a TE output port. Initial signal lights of the device enter from the left port 1 and the lower port 2, a TE light wave outputs from the upper port 4, and a TM light wave outputs from the right port 3. Each background tellurium dielectric cylinder 5 has an optical axis direction which is vertical to a paper surface and outward, and has a radius $R=0.3431a$. Each square defect dielectric cylinder 6 has an optical axis direction which is parallel to the paper surface and the lower port surface of the corresponding cube, has a side length $L=0.538a$, and has a position center which is the same as the circle centers of the corresponding background dielectric cylinders 5 deleted for forming the waveguide. Each round defect dielectric cylinder 7 has an optical axis direction which is the same as those of the corresponding background dielectric cylinders, has a radius $R=0.165a$, and has a position center which is the same as the circle centers of the corresponding background dielectric cylinders 5 deleted for forming the waveguide.

The introduction of principle for the present invention is mainly described with regard to the tellurium dielectric. Tellurium is a positive uniaxial crystal, and in many scientific researches, it is approximately considered that the tellurium dielectric has no chromatic dispersion in an infrared wave band from 3.5 microns to 35 microns, that is, and $n_o=4.8$ and $n_e=6.2$. However, in consideration of much accurately grasping the essential characteristics of the tellurium photonic crystal, and better guiding practical applications, all research results in the present invention are obtained on the basis of an Sellmeier chromatic dispersion curve of the tellurium photonic crystal. A Sellmeier chromatic dispersion equation of the tellurium dielectric is as follows:

$$n_e=[29.5222+9.3068\lambda^2(\lambda^2-2.57661)^{-1}+9.2350\lambda^2(\lambda^2-13521)^{-1}]^{1/2} \quad (1)$$

$$n_o=[18.5346+4.3289\lambda^2(\lambda^2-3.9810)^{-1}+3.7800\lambda^2(\lambda^2-11813)^{-1}]^{1/2} \quad (2)$$

When each e optical axis and the axes of the corresponding dielectric cylinders are in the same direction, the photonic bandgap of the photonic crystal can be obtained through plane wave expansion. When the photonic crystal is a square lattice, the lattice constant is a, and the radius is 0.3431a, the photonic bandgap of the photonic crystal is from 3.893(ωa/2πc) to 4.223(ωa/2πc), and a light wave with any frequency in the range is restricted in the waveguide.

In the present invention, the point defects are introduced in the abovementioned waveguide, the equivalent refractive indexes of the point defects with regard to the light waves with different polarization states are different, and then point defect parameters meeting total reflection in a single polarization state and meeting total transmission in another polarization state are determined. The propagation of the light waves with the different polarization states in the corresponding waveguides allowed can be realized by applying these point defects with different specifications to the vicinities of the port surfaces of the waveguides with different polarization states, and mutual influence is not caused at the intersection position of the waveguides.

Figure 2:
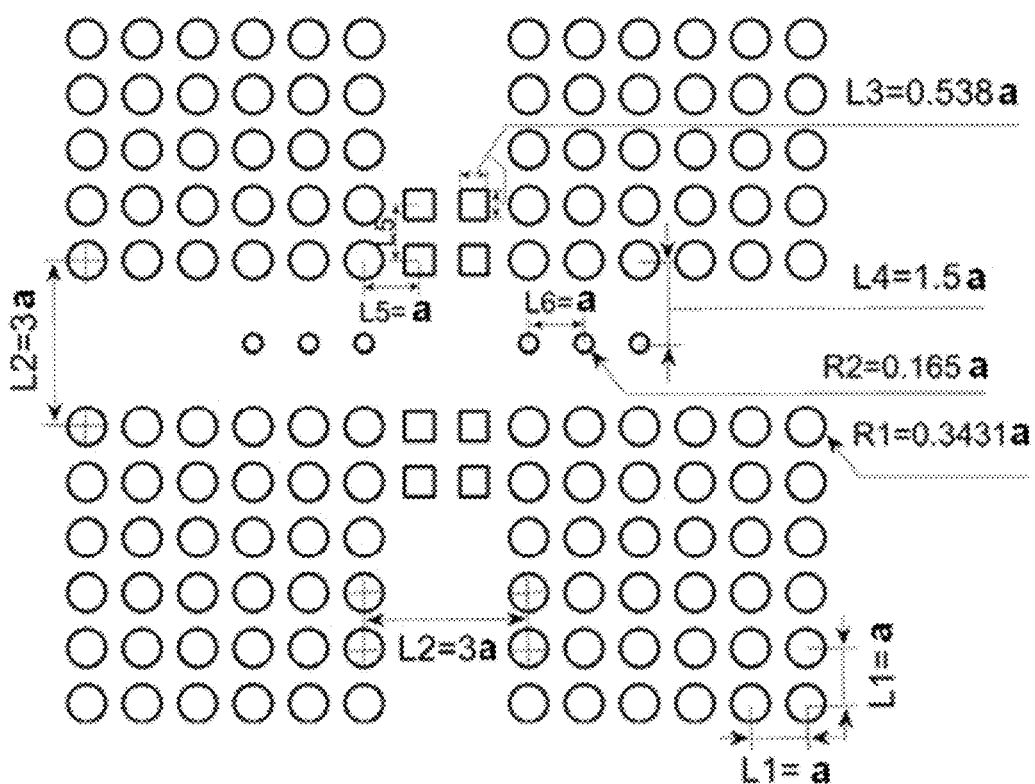
FIG. 2 is a structural schematic diagram and a parameter distribution diagram of the cross-shaped infrared polarized light bridge based on the photonic crystal of the present invention.

As shown in FIG. 1 and FIG. 2, according to the tellurium dielectric waveguide used in the present invention, the guided wave waveguide needs to be formed by deleting two rows or two columns of dielectric cylinders, wherein $L_1$=a, $L_2$=3a, and the radius of each background dielectric cylinder 5, $R_1$=0.3431a. A Cartesian rectangular coordinate system is used in the present invention: an x-axis positive direction is horizontally rightward; a y-axis positive direction is vertically upward in the paper surface; and a z-axis positive direction is vertical to the paper surface and outward.

The equivalent refractive indexes of the point defect are as follows:

$$n_{eff}^{TE} = \frac{\int_\Omega n_e \cdot E_z^2 d\Omega}{\int_\Omega E_z^2 d\Omega} \quad (3)$$

$$n_{eff}^{TM} = \frac{\int_\Omega n_o \cdot (E_x^2 + E_y^2) d\Omega}{\int_\Omega (E_x^2 + E_y^2) d\Omega} \quad (4)$$

where, $n_{eff}^{TE}$ and $n_{eff}^{TM}$ are corresponding to the equivalent refractive indexes for the TE light and the TM light respectively, and $E_x$, $E_y$ and $E_z$ are an x component, a y component and a z component of an electric field respectively.

The reflectivities (R) and the transmissivities (T) of the light waves in the waveguide at the point defects can be expressed as follows:

$$R_{TE} = \left(\frac{n_{eff}^{TE} - 1}{n_{eff}^{TE} + 1}\right)^2 \quad T_{TE} = \frac{4n_{eff}^{TE}}{(n_{eff}^{TE} + 1)^2} \quad (5)$$

$$R_{TM} = \left(\frac{n_{eff}^{TM} - 1}{n_{eff}^{TM} + 1}\right)^2 \quad T_{TM} = \frac{4n_{eff}^{TM}}{(n_{eff}^{TM} + 1)^2} \quad (6)$$

The radius of the dielectric cylinder which meets the two conditions of $T_{TE}\approx 1$, $T_{TE}\approx 0$ and $R_{TM}\approx 0$, $T_{TM}\approx 1$ can be determined by adjusting the sizes of the dielectric cylinders, thus a function of blocking the TE light and transmitting the TM light is realized.

It is obtained through numerical scanning calculation that the radius of each round dielectric cylinder 7 when the TM wave has the maximum extinction ratio is $$R_2 = 0.165a. \quad (7)$$

At his moment, $n_{eff}^{TE} \to \infty$, $n_{eff}^{TM} \to 1$.

Meanwhile, the radius of the dielectric cylinder which meets the two conditions of $R_{TE}\approx 0$, $T_{TE}\approx 1$ and $R_{TM}\approx 1$, $T_{TM}\approx 0$ can be determined by adjusting the sizes of two rows of parallel dielectric cylinders simultaneously, thus a function of blocking the TM light and transmitting the TE light is realized. (At this moment, the biasing direction of the e optical axis of each dielectric cylinder is orthogonal to the propagation directions of the waves).

It is obtained through numerical scanning calculation that the side length of each square dielectric cylinder 6 when the TE wave has the maximum extinction ratio is $$L_3 = 0.538a \quad (8)$$

At this moment, $n_{eff}^{TE} \to 1$, $n_{eff}^{TM} \to \infty$.

The central positions of the three round dielectric cylinders 7 for horizontal passage of the TM waveguide are at the intersection point of the horizontal central line of the waveguide and the central line of the first column of the dielectric cylinders for passage of the TM waveguide, and the distances between the center of each point defect and the centers of the corresponding upper and lower dielectric cylinders are $$L_4 = 1.5a \quad (9)$$

The vertical central positions of the four square dielectric cylinders 6 for vertical passage of the TE waveguide are the same as the vertical central positions of the background dielectric cylinders in the row where the four square dielectric cylinders 6 are located, and the distances between each horizontal central position and the corresponding background dielectric cylinders 5 at the left side and the right side respectively are $$L_5 = a \quad (10)$$

The biasing direction of the e optical axis of each of the four square dielectric cylinders 6 for vertical passage of the TE waveguide is different from those of other point defects and the background dielectric cylinders 5, and the biasing direction is the horizontal x-axis.

As shown in FIG. 1 and FIG. 2, in the four square dielectric cylinders 6 at the port for passage of the TE waveguide, the center of each square dielectric cylinder is the same as the centers of the corresponding round dielectric cylinders 7 thereof deleted for forming the waveguide, therefore, the respective distances of the four square dielectric cylinders 6 are a, the distance between each of the four square dielectric cylinders 6 and the center of the closest background dielectric cylinder 5 is also a, and the respective side lengths are 0.538a. The optical axes of the four square tellurium dielectric columns are orthogonal to the optical axes of the background cylindrical tellurium dielectric columns in the photonic crystal, and meanwhile, each optical axis direction is parallel to the upper side and the lower side of the corresponding square in FIG. 1 and FIG. 2, and orthogonal to the left side and the right side of the corresponding square.

Meanwhile, in the three round defect dielectric cylinders 7 at the port for passage of the TM waveguide port, the center of each round dielectric cylinder is the same as the centers of the corresponding round dielectric cylinders thereof deleted for forming the waveguide, therefore, the respective distances of the three round dielectric cylinders 7 are a, the distance between each of the three round dielectric cylinders 7 and the center of the closest background dielectric cylinder 5 is also a, and the respective radiuses are 0.165a. The optical axes of the three round dielectric cylinders are consistent with the optical axes of the background cylindrical tellurium dielectric columns in the photonic crystal in direction.

After the abovementioned defects are introduced in the tellurium dielectric cylinder array waveguide, incident signal ports are the positions of the TM optical signal input port 1 and the TE optical signal input port 2 in FIG. 1; lights are propagated in the waveguide formed by the arrays of the dielectric cylinders 5; after the TE optical signal arrives at the positions of the defects in the form of the square defect dielectric cylinders 6, the TE optical signal quantities all pass through, and the TM components mixed are all blocked; and after the TM optical signal arrives at the positions of the defects in the form of the round defect dielectric cylinders 7, the TM optical signal quantities all pass through, and the TE components mixed are all blocked. Finally, the TE optical signal outputs at the position of the output port 4; and the TM optical signal outputs at the position of the output port 3. Meanwhile, mutual influence of the optical signals with different polarization states is not caused in the central intersection area; that is, the polarized light bridge capable of allowing the light circuits to be cross-intersected and avoiding the mutual influence of the signals is formed in the shared central area. Because the structure has a function of polarization state selection, the structure has many different functions below with regard to the different input signals:

1. When the incident optical signal of the port 1 is a TM wave, and the incident optical signal of the port 2 is a TE wave, the TM optical signal in the port 1 is purified through polarization and then outputs from the right port 3; and the TE optical signal in the port 2 is purified through polarization and then outputs from the upper port 4, and mutual influence is not caused at the cross intersection position.

2. When the incident optical signals of the port 1 and the port 2 are hybrid waves containing TM components and TE components simultaneously, the TM components in the port 1 all output from the right port 3; the TE components in the port 2 all output from the upper port 4; the TE wave in the port 1 is reflected back from the port 1; and the TM wave in the port 2 is reflected from the port 2.

3. When the incident optical signal waves of the port 1 and the port 2 are only TM waves, the TM wave from the port 1 outputs from the right port 3, the TM wave from the port 2 is reflected back from the port 2, and there is no optical signal output from the upper port 4.

4. When the incident optical signal waves of the port 1 and the port 2 are only TE waves, the TE wave from the port 2 outputs from the upper port 4, the TE wave from the port 1 is reflected back from the port 1, and there is no optical signal guided out from the right port 3.

5. When the incident optical signal waves of the port 1 and the port 2 are the TE wave and the TM wave respectively, there is no optical signal output from any output port.

Selection for the lattice constant and an operating wavelength can be determined in the following manner. It can be known through the refractive index curve of uniaxial crystal tellurium that, tellurium has a relatively stable refractive index in a wavelength range from 3.5a to 35a (considering chromatic dispersion, structural configuration parameters need to be recalculated according to a chromatic dispersion formula in the applied wave band range, so as to achieve a purpose of selection of the optimal parameter). Through the formula $$f = \frac{\omega a}{2\pi c} = \frac{a}{\lambda} \tag{11}$$

where ω a circular frequency, and is a normalized frequency of f, and a normalized bandgap frequency range of a square lattice tellurium structure in the present invention is $$f=0.2368\sim0.2569 \tag{12}$$

A corresponding bandgap wavelength range is calculated as follows:

$$\lambda=3.893a\sim4.223a \tag{13}$$

Hence, a λ value in an equal proportion to the lattice constant a and meeting the wavelength range can be obtained by changing the value of the lattice constant a in case of no consideration of frequency dispersion or little change of frequency dispersion of a material.

The extinction ratios for the waveguide are defined as follows:

The TE wave:

$$\text{Extinction Ratio}_{TE} = 10 \times \log_{10}\left(\frac{I_{TE}}{I_{TM}}\right) \tag{14}$$

The TM wave:

$$\text{Extinction Ratio}_{TM} = 10 \times \log_{10}\left(\frac{I_{TM}}{I_{TE}}\right) \tag{15}$$

The degrees of polarization are defined as follows
The TE wave:

$$\text{Degree of Polarization}_{TE} = \left|\frac{I_{TE} - I_{TM}}{I_{TE} + I_{TM}}\right| \tag{16}$$

The TM wave:

$$\text{Degree of Polarization}_{TM} = \left|\frac{I_{TM} - I_{TE}}{I_{TM} + I_{TE}}\right| \tag{17}$$

The insertion loss is defined as follows:

$$\text{Insertion Loss (dB)}=10\times\log_{10}(P_{in}/P_{out}). \tag{18}$$

Figure 3:
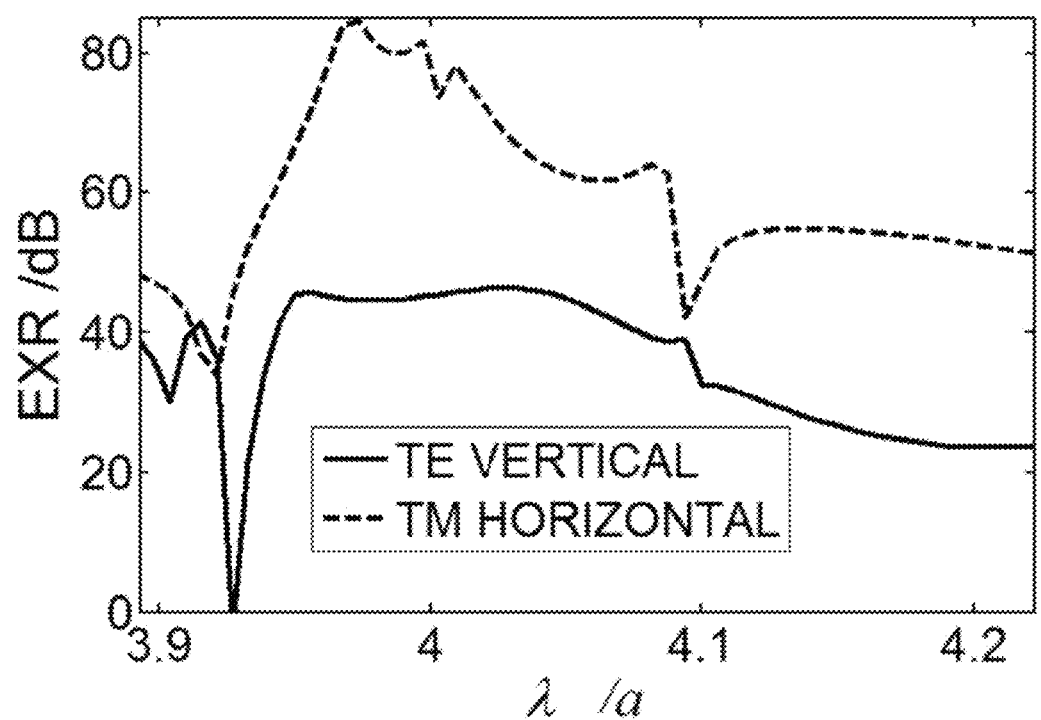
FIG. 3 shows an extinction ratio (EXR) of each channel of the polarized light bridge of the present invention in a bandgap frequency range.
Figure 4:
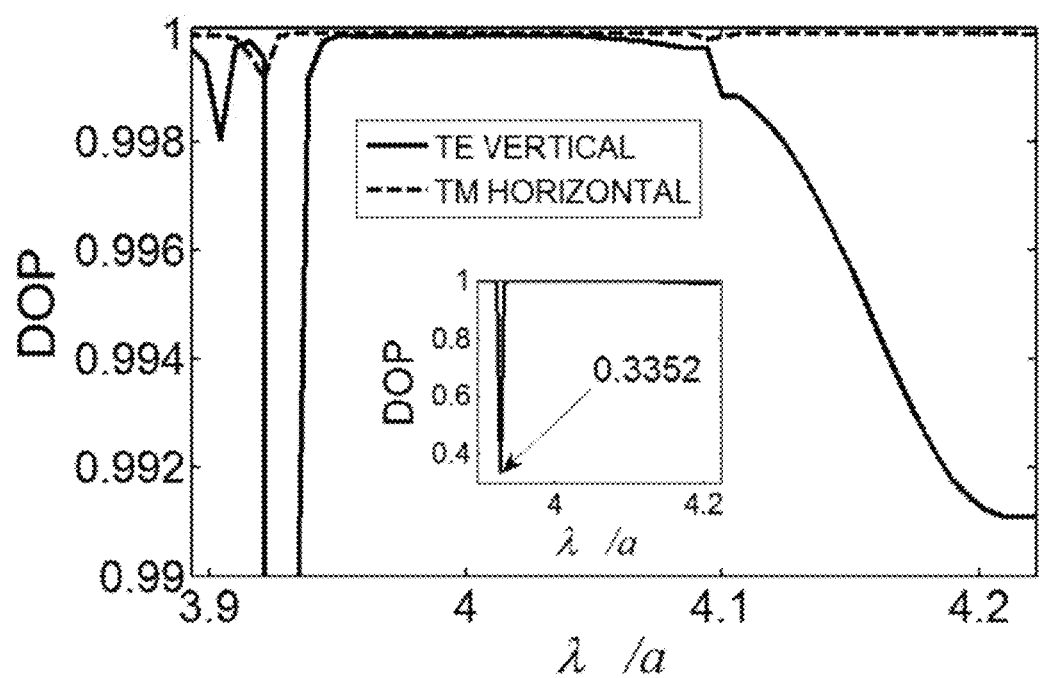
FIG. 4 shows a degree of polarization (DOP) of each channel of the polarized light bridge of the present invention in a bandgap frequency range.
Figure 5:
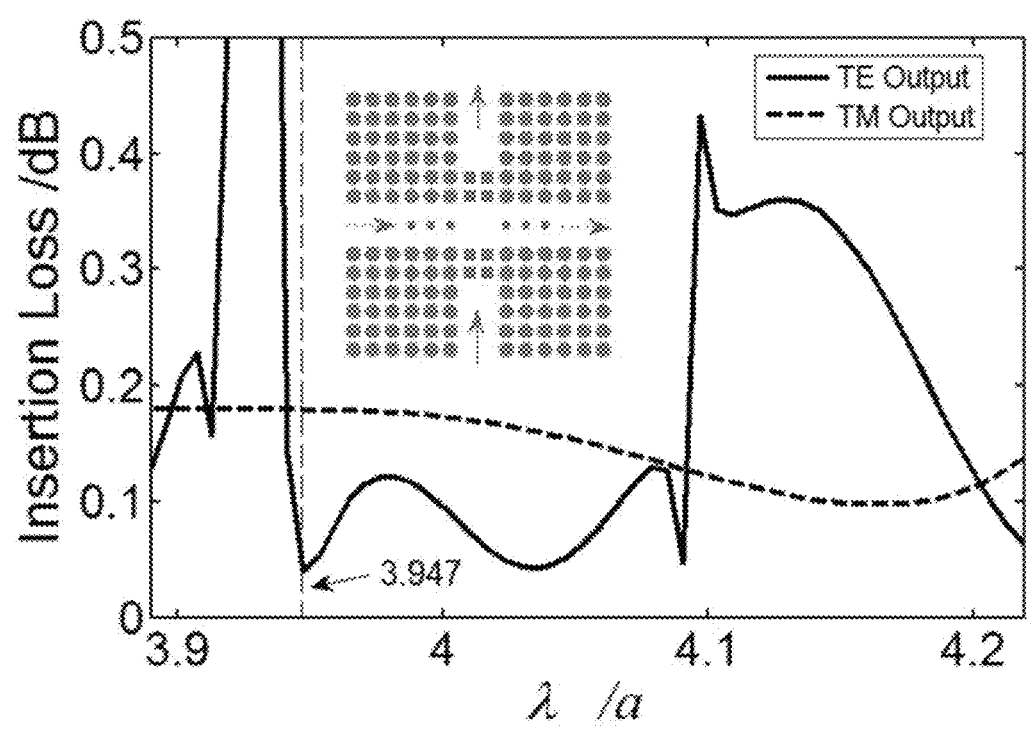
FIG. 5 shows an insertion loss of each channel of the polarized light bridge of the present invention in a bandgap frequency range.

It can be known through FIG. 3 that, when the working wavelength is 3.947 to 4.223, the extinction ratios of the TE wave to the TM wave are both greater than 20 dB; it can be observed from FIG. 4 that, the TE wave and the TM wave both have the degrees of polarization, which approximate to 1; and meanwhile, the insertion losses shown in FIG. 5 indicate that all the insertion losses in the interval are lower than 0.5 dB.

FIG. 6 is a simulated diagram of a light field, which is obtained by calculating through finite element software COMSOL, wherein when the operating wavelength in free space is 4.05a, the refractive index of an ordinary light and the refractive index of an extraordinary light of the tellurium dielectric are $n_o$=4.924 and $n_e$=6.368 respectively according to the Sellmeier equation. It can be observed that, the TE wave and the TM wave are efficiently propagated in the respective pass bands respectively, pass through the cross-intersected light bridge without mutual influence, and have extremely high extinction ratios and degrees of polarization, and extremely low insertion losses. Meanwhile, it can be seen from the simulated experiment diagram that, the transversal optical signal and the longitudinal optical signal do not generate waveform changes at an intersection junction, thus greatly realizing the fidelity characteristic of the signals. See FIGS. 6(a) and 6(b) for details.

Figure 6A:
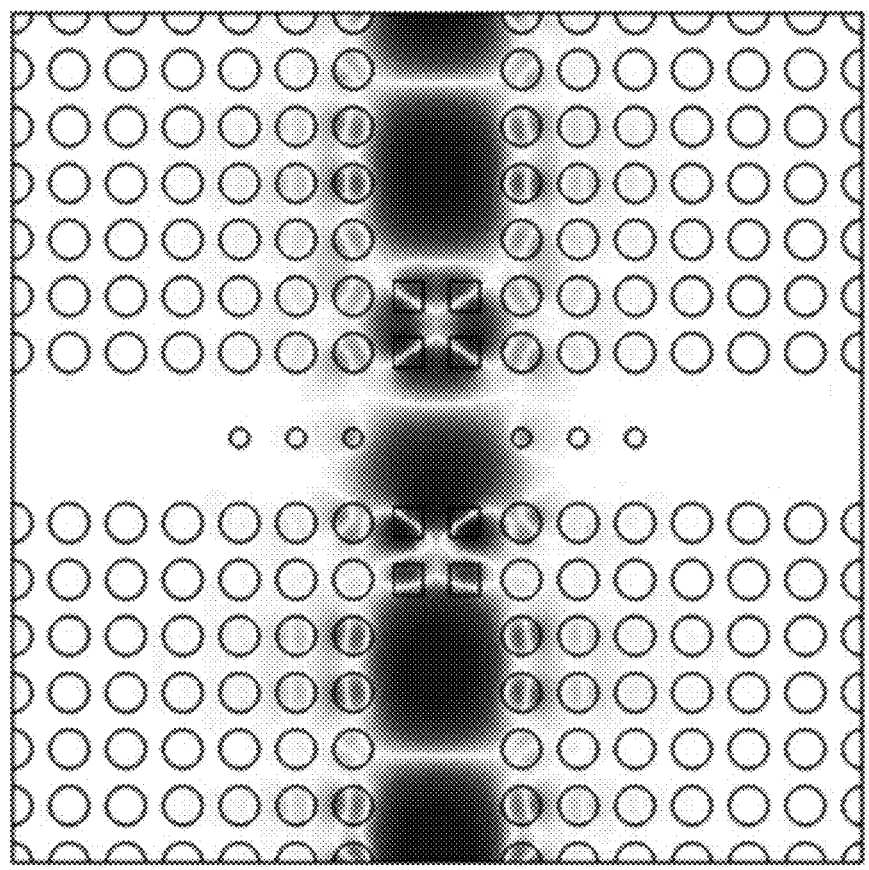
FIG. 6A is a schematic diagram of light field distribution when function (1) is realized by the polarized light bridge of the present invention.
Figure 6B:
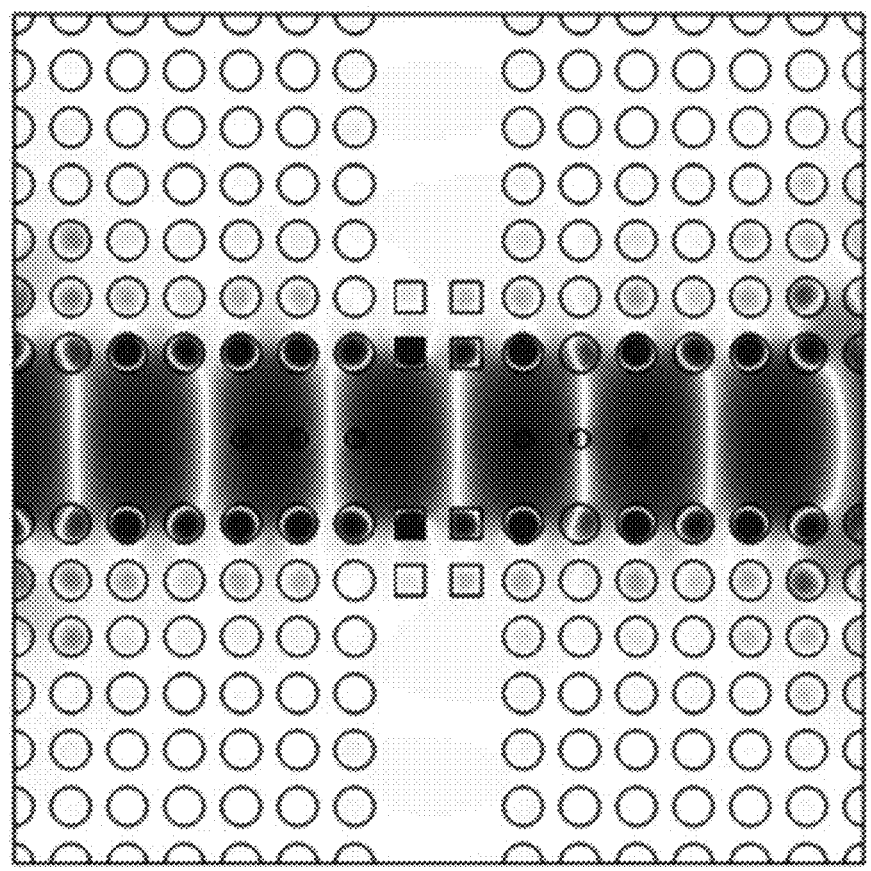
FIG. 6B is a schematic diagram of light field distribution when function (2) is realized by the polarized light bridge of the present invention.

The FIGS. 6(a) and 6(b) are the simulated experiment diagrams of the light field when the abovementioned function (1) is realized. That is, the high-purity TM optical signal enters from the incident port 1, and the high-purity TE optical signal enters from the incident port 2. In FIG. 6, (a) is an intensity distribution diagram of the TE components of the whole field, and (b) is an intensity distribution diagram of the TM components of the whole field. It can be observed that, either the TE signal or the TM signal almost keeps the original intensity and continues to propagate after passing through the cross-shaped bridge, without any crosstalk at the cross intersection part.

Figure 6C:
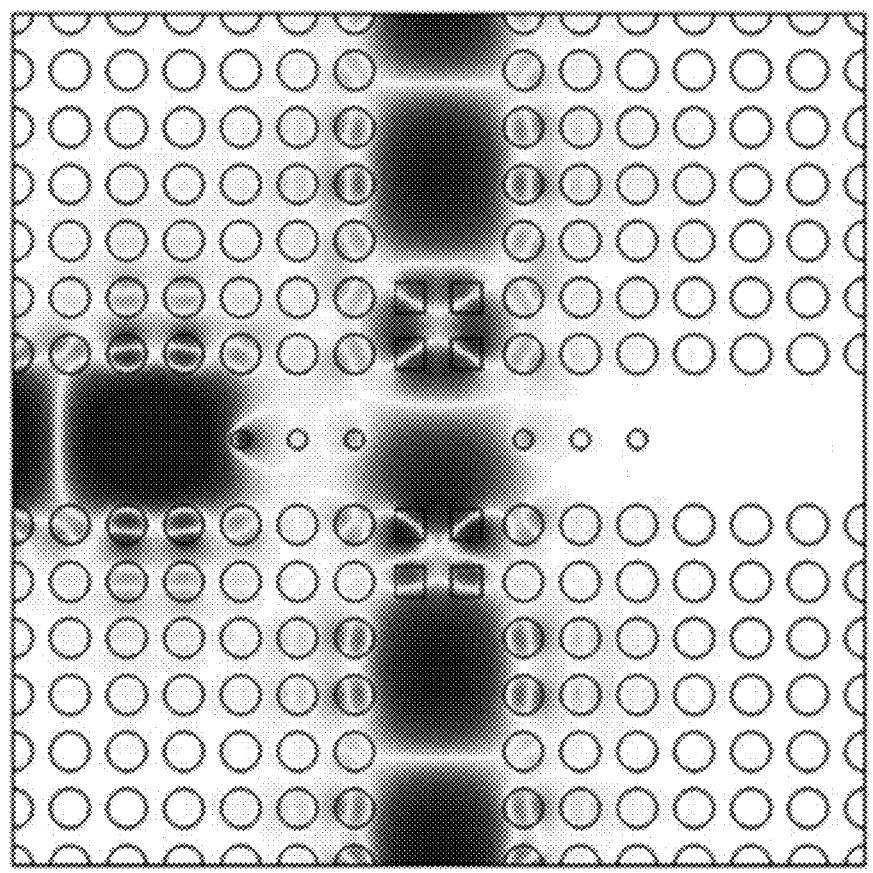
FIG. 6C is a schematic diagram of light field distribution when function (4) is realized by the polarized light bridge of the present invention.

FIG. 6(c) is a simulated experiment diagram of the light field when the abovementioned function (4) is realized. That is, the high-purity TE optical signal enters from both of the incident ports 1 and 2. It can be seen from FIG. 6(c) that, the TE wave is guided out from the upper port 4 and there is no optical signal guided out from the right port 3.

Figure 6D:
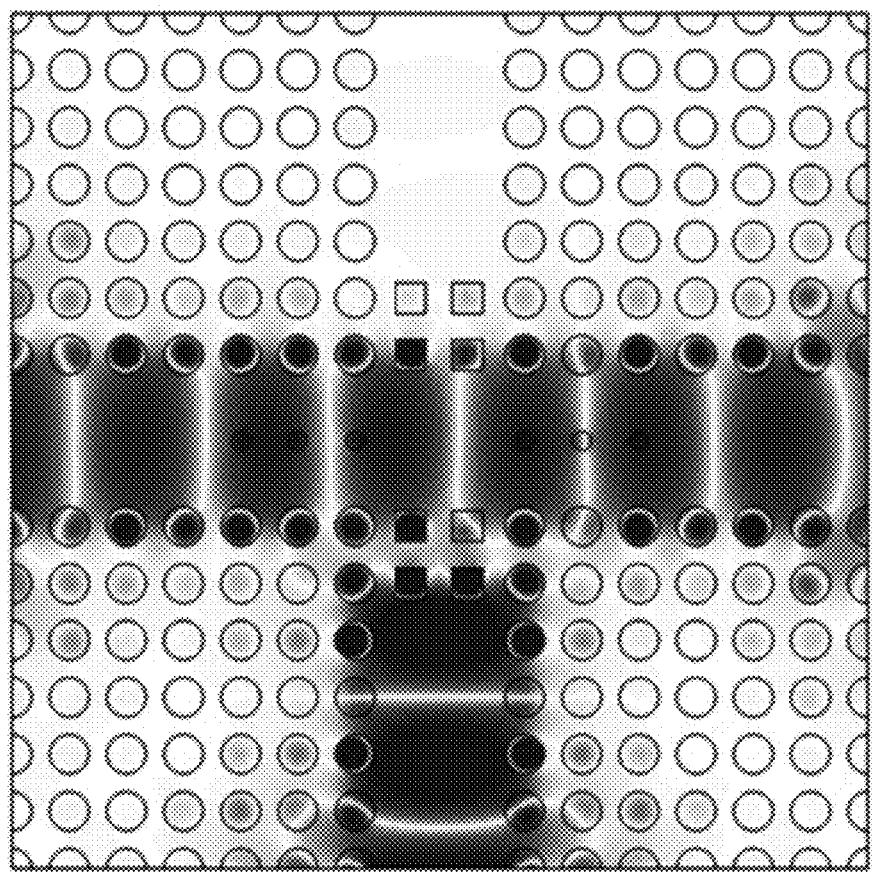
FIG. 6D is a schematic diagram of light field distribution when function (3) is realized by the polarized light bridge of the present invention.

FIG. 6(d) is a simulated experiment diagram of the light field when the abovementioned function (3) is realized. That is, the high-purity TM optical signal enters from both of the incident ports 1 and 2. It can be seen from FIG. 6(d) that, the TM wave is guided out from the right port 3; and there is no optical signal guided out from the upper port 4.

Due to space limitations, the simulated experiment results of the function (2) and the function (5) are not described redundantly herein, and can be deduced completely from the experiment results of the three functions (1), (3) and (4) realized in FIG. 6.

According to the present invention, the waveguide can be formed in a manner of establishing positive uniaxial crystal tellurium arrays arranged into a square lattice on a substrate, and deleting two rows or two columns of the positive uniaxial crystal tellurium arrays at the central position, so that the TE light and the TM light can both propagate in the form of a fundamental mode. The optical axis direction of the e light of each cylinder in the background tellurium dielectric cylinder arrays in the photonic crystal needs to meet consistency with the axis direction of the corresponding cylinder. The operating wavelength can be adjusted through the lattice constant among the dielectric cylinders in case of no consideration for chromatic dispersion or negligible frequency dispersion.

Figure 7A:
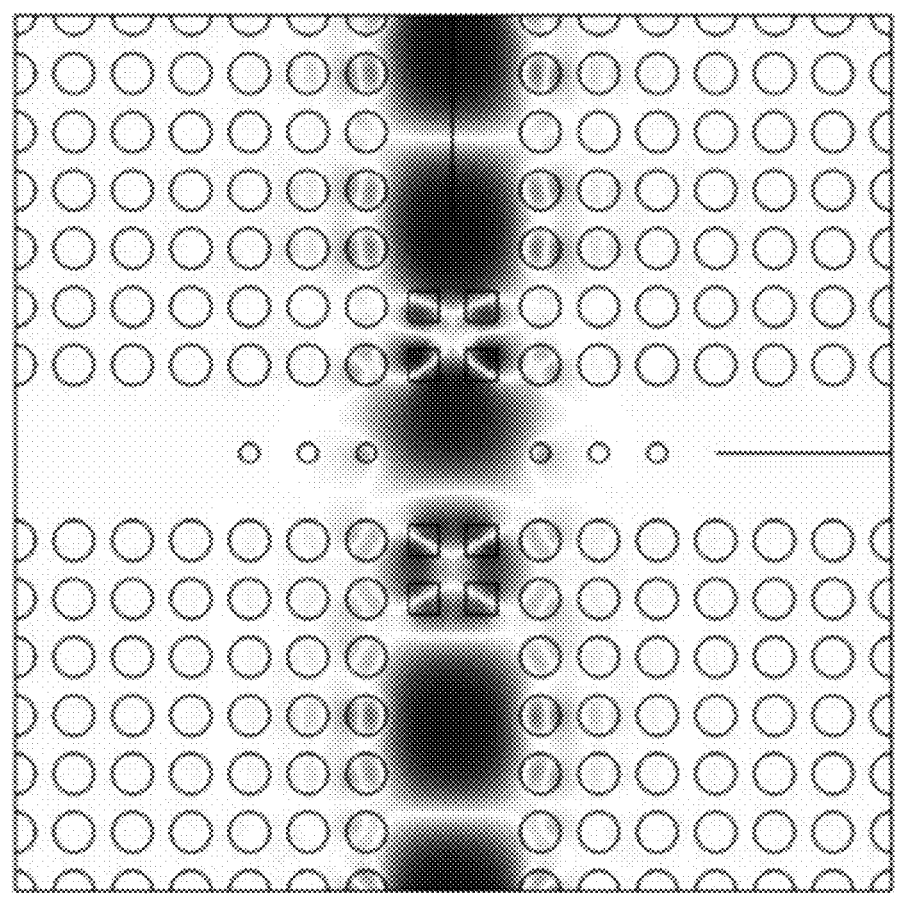
FIGS. 7A and 7B are distribution diagrams of light field components in the light bridge of FIG. 1.
Figure 7B:
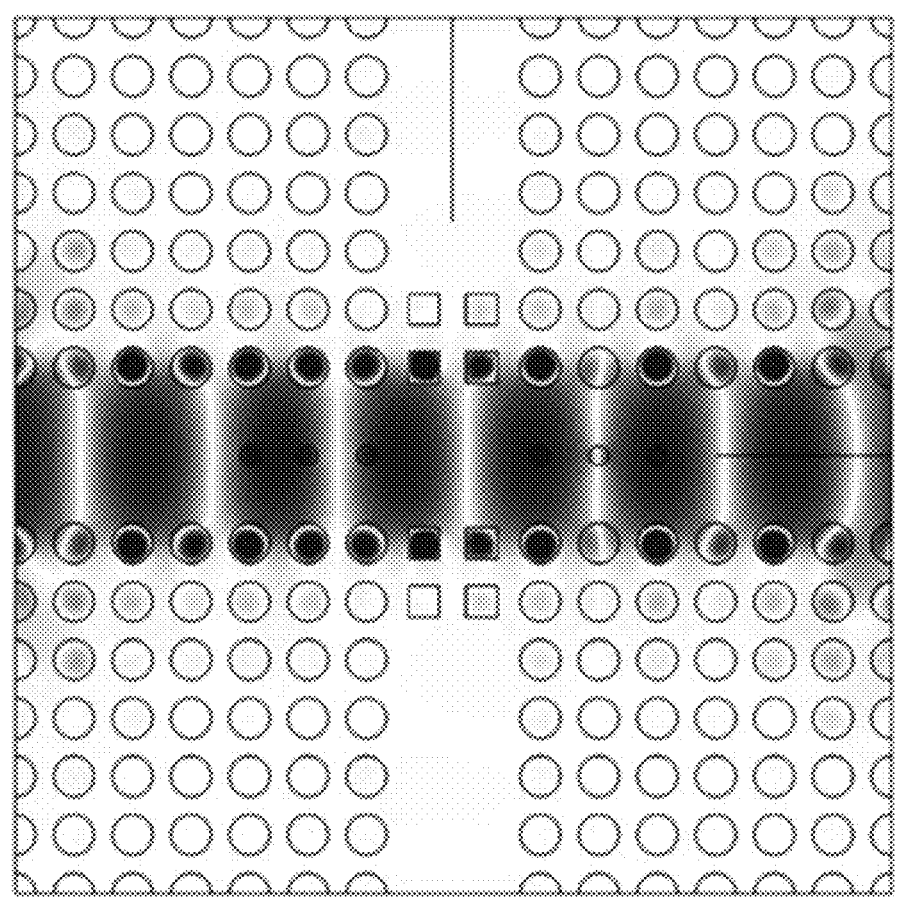

For example, if the device needs to work in a wave band near 5 μm and the frequency dispersion caused by adjusting the operating wavelength to 5 μm is supposed not to be considered, the lattice constant can be magnified 1.25 times through the formula (11), that is, a=1.25 μm. At this moment, the bandgap wavelength range becomes 4.866 to 5.279. The light bridge characteristic of the device is the same as the result shown in FIG. 6. Because the chromatic dispersion of the tellurium dielectric tends to be stable between 3.5 μm to 35 μm, and has a low influence on the normalized bandgap frequency range of the photonic crystal, the actual chromatic dispersion conditions (that is, $n_o$=4.8657 and $n_e$=6.315) at 5 μm can be substituted into a magnification structure without the consideration for the chromatic dispersion. According to the simulated experiment, a numerical simulation result after the consideration for the chromatic dispersion completely meets the established functional requirements of the original light bridge. That is, when the operating wavelength is 5 μm, the extinction ratio of the TE wave in a TE channel is 65.71 dB, the degree of polarization is 0.9999, and the insertion loss is 0.05 dB; and the extinction ratio of the TM wave in a TE channel is 81.40 dB, the degree of polarization is 0.9999, and the insertion loss is 0.16 dB. Hence, the cross-shaped infrared polarized light bridge based on the photonic crystal waveguide of the present invention has the characteristic of easiness in flexible application. FIG. 7 is a distribution diagram of the TE components in the light bridge shown in FIG. 7(a) and a distribution diagram of the TM components in the light bridge shown in FIG. 7(b) after the TM signal and the TE signal are input from the port 1 and the port 2 (see FIG. 1) respectively in case of input under the abovementioned working wavelength of 5 μm.

The specific embodiments and application scopes of the present invention above are improved, which should not be interpreted as a limitation to the present invention.

We claim:

1. A cross-shaped infrared polarized light bridge based on a photonic crystal waveguide comprising:
   a photonic crystal waveguide provided with a complete bandgap, wherein the photonic crystal waveguide is in a cross shape, the photonic crystal cross-shaped waveguide is provided with the defect dielectric cylinders, and the waveguide defect dielectric cylinders are square defect dielectric cylinders and round defect dielectric cylinders; the photonic crystal cross-shaped waveguide includes a vertical TE waveguide, a horizontal TM waveguide, a TM optical signal input port, a TM output port, a TE optical signal input port and a TE output port;
   the defect dielectric cylinders in the vertical TE waveguide are eight square dielectric cylinders, the defect dielectric cylinders in the horizontal TM waveguide are six round dielectric cylinders; and the central positions of the eight square dielectric cylinders within the vertical TE waveguide and the six round dielectric cylinders within the horizontal TM waveguide are the same as the central positions of the corresponding background dielectric cylinders thereof deleted for forming the waveguides;
   a left port, a right port, an upper port and a lower port of the photonic crystal waveguide are the TM optical signal input port, the TM output port, the TE optical signal input port and the TE output respectively; and the photonic crystal waveguide has a structure formed without 4 rows of the dielectric cylinders from the photonic crystal; and
   the two input ports of the photonic crystal waveguide input a TM optical signal and a TE optical signal respectively, mutual influence is not caused at the cross intersection position of light circuits formed by the TM wave and the TE wave in a shared central area, the input TM optical signal outputs from the TM output port, and the input TE optical signal outputs from the TE output port.

2. The cross-shaped infrared polarized light bridge of claim 1, wherein the photonic crystal waveguide is a two dimensional photonic crystal waveguide, including a two dimensional tellurium dielectric photonic crystal waveguide, a two dimensional cellular-structure photonic crystal waveguide, a two dimensional hole-like triangular lattice photonic crystal waveguide and various two dimensional photonic crystal waveguides with various irregular shapes.

3. The cross-shaped infrared polarized light bridge of claim 1, wherein the photonic crystal waveguide structure does not have 1 or 2 or 3 rows of the dielectric cylinders from the photonic crystal.

4. The cross-shaped infrared polarized light bridge of claim 1, wherein the plane of the photonic crystal waveguide is vertical to the axes of the dielectric cylinders in the photonic crystal.

5. The cross-shaped infrared polarized light bridge of claim 1, wherein the refractive index of an e-light, abbreviation of extra-ordinary light, in each of the waveguide defect dielectric cylinders is greater than the refractive index of an o-light, abbreviation of extra-ordinary light, and the optical axes of the square waveguide defect dielectric cylinders are parallel to the plane of the photonic crystal waveguide and orthogonal to propagation directions of THE TE wave.

6. The cross-shaped infrared polarized light bridge of claim 1, wherein the optical axes of the round defect dielectric cylinders of the TM waveguide are consistent with the optical axes of the background dielectric cylinders in direction.

7. The cross-shaped infrared polarized light bridge of claim 1, wherein a waveguide is formed by background tellurium dielectric cylinder arrays, and the waveguide is a guided wave waveguide formed by deleting two lines and two columns of dielectric cylinders.

\* \* \* \* \*